United States Patent [19]

McKinney et al.

[11] 4,427,168
[45] Jan. 24, 1984

[54] VARIABLE CAMBER LEADING EDGE MECHANISM WITH KRUEGER FLAP

[75] Inventors: Maurice E. McKinney, Bellevue; Peter K. C. Rudolph, Seattle, both of Wash.

[73] Assignee: The Boeing Company, Seattle, Wash.

[21] Appl. No.: 306,747

[22] Filed: Sep. 29, 1981

[51] Int. Cl.³ ............................................. B64C 3/50
[52] U.S. Cl. .................................. 244/214; 244/219
[58] Field of Search ................ 244/214, 219, 210, 215

[56] References Cited

U.S. PATENT DOCUMENTS 3,743,219  7/1973  Gorges ............................... 244/210
3,994,451  11/1976  Cole ..................................... 244/219

*Primary Examiner*—Trygve M. Blix
*Assistant Examiner*—Ivy Shum
*Attorney, Agent, or Firm*—Huges, Barnard & Cassidy

[57] ABSTRACT

An actuating mechanism for variable camber leading edges of aerodynamic airfoils characterized by its rigidity and structural stability and which permits varying the camber of a flexible continuous airfoil skin through leading edge deflection angles ranging from on the order of 14° to on the order of 22° with reference to the wing box chord line without deployment of a Krueger flap and up to on the order of 32° with deployment of a Krueger flap; and, which permits varying the camber of a flexible continuous airfoil skin while maintaining a uniform, essentially constant curvature throughout the chordal extend of deflection for any given degree of deflection; yet, wherein: (a) the upper continuous flexible airfoil skin (i) is not required to provide load bearing support, (ii) is not subjected to chord-wise stress from movement of the actuating linkage, and (iii) is not subjected to localized stress resulting from non-uniform deflection; (b) the actuating linkage is contained entirely within the airfoil aerodynamic contour or airfoil envelope at all operating positions; (c) the actuating linkage may be readily employed with a wide range of conventional structural wing box configurations; and (d), which permits of deployment of either "slotted" Krueger flaps to meet operating requirements during take-off and landing operations or to function as an inflight speedbrake under both high speed and low speed flight conditions. More specifically, the variable camber leading edge actuating mechanism comprises a simple 4-bar linkage arrangement which readily permits of incorporation of Krueger flaps actuated by a suitable torque tube extending span-wise through the deflectable leading edge of the airfoil.

18 Claims, 15 Drawing Figures

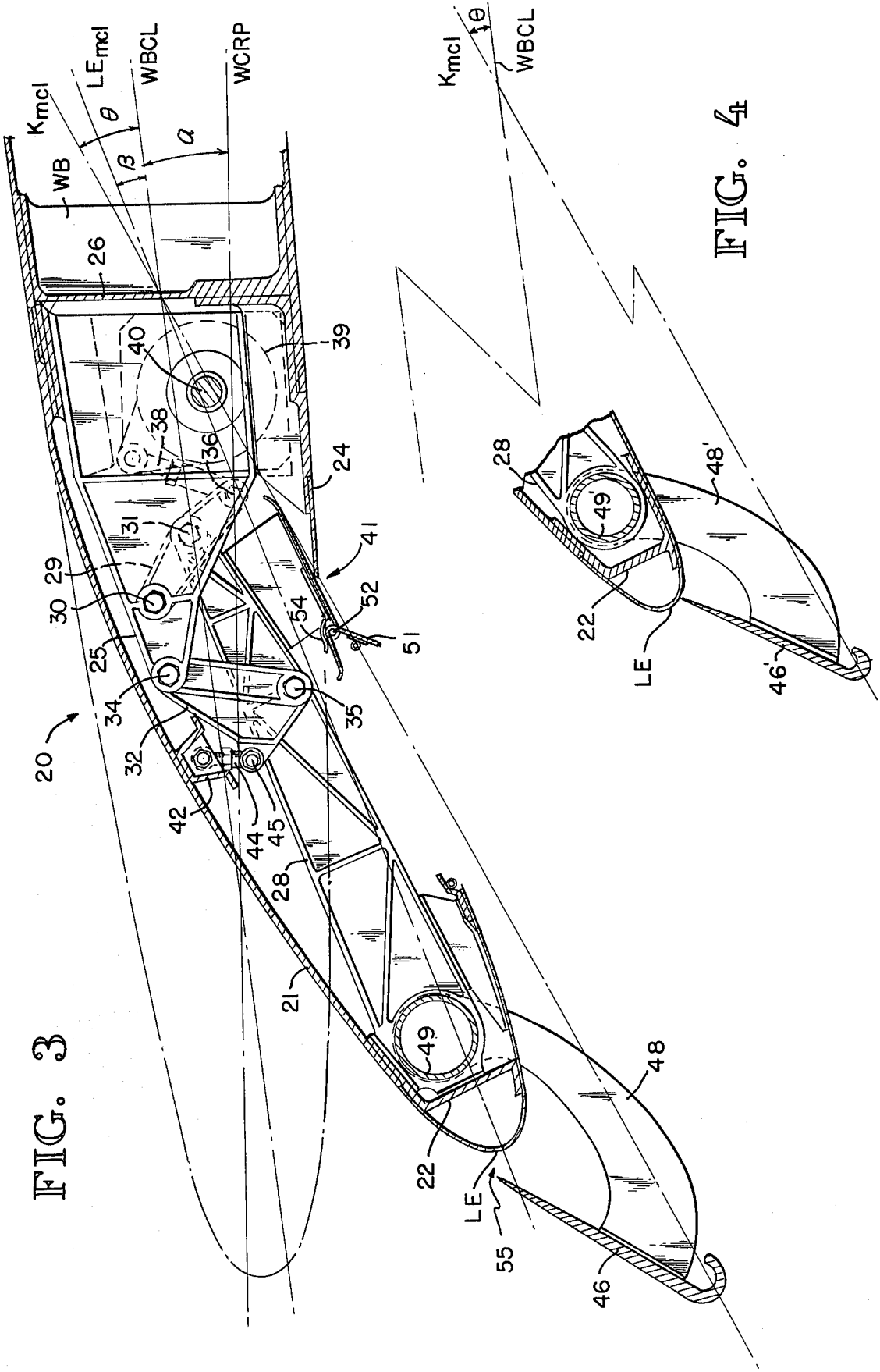

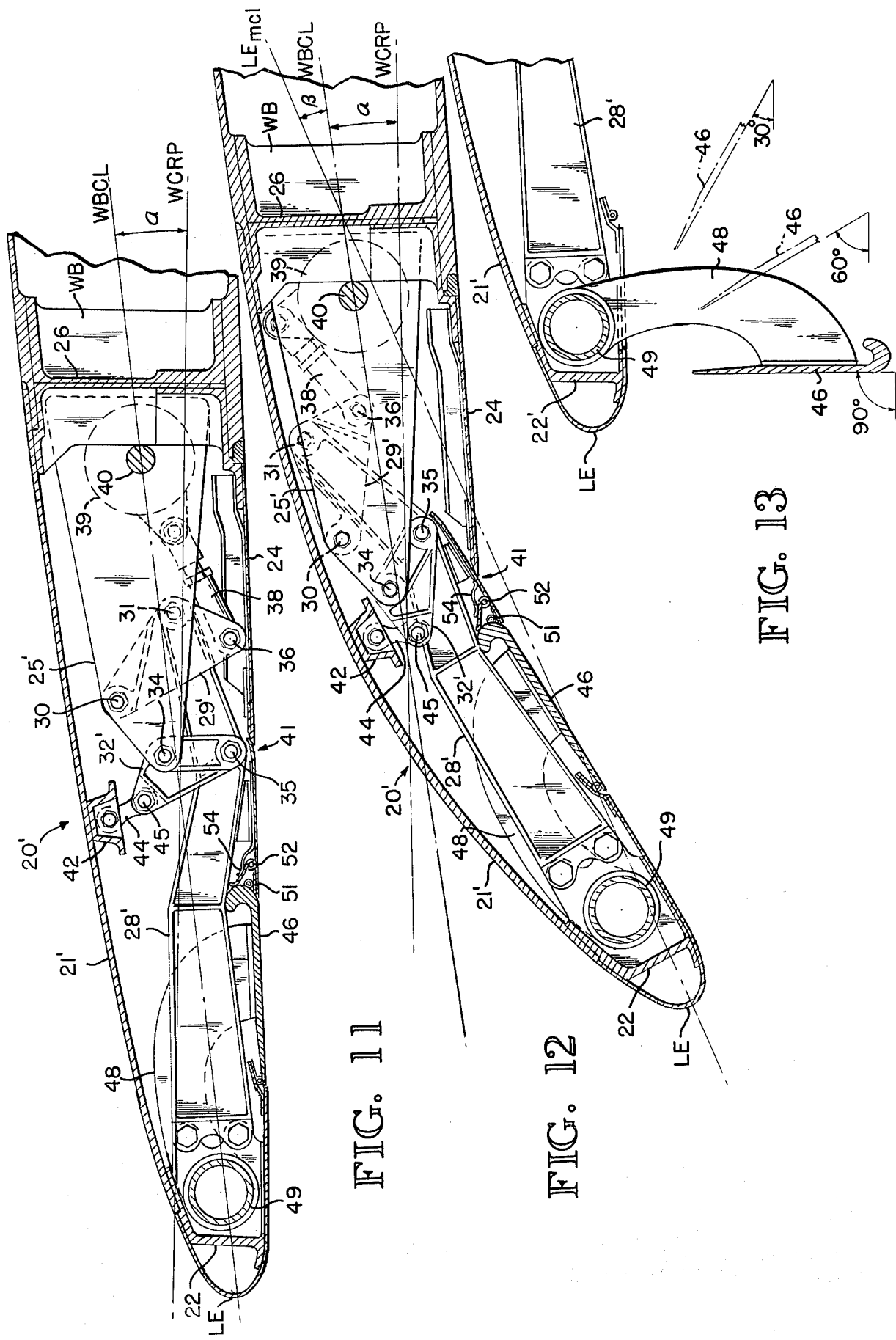

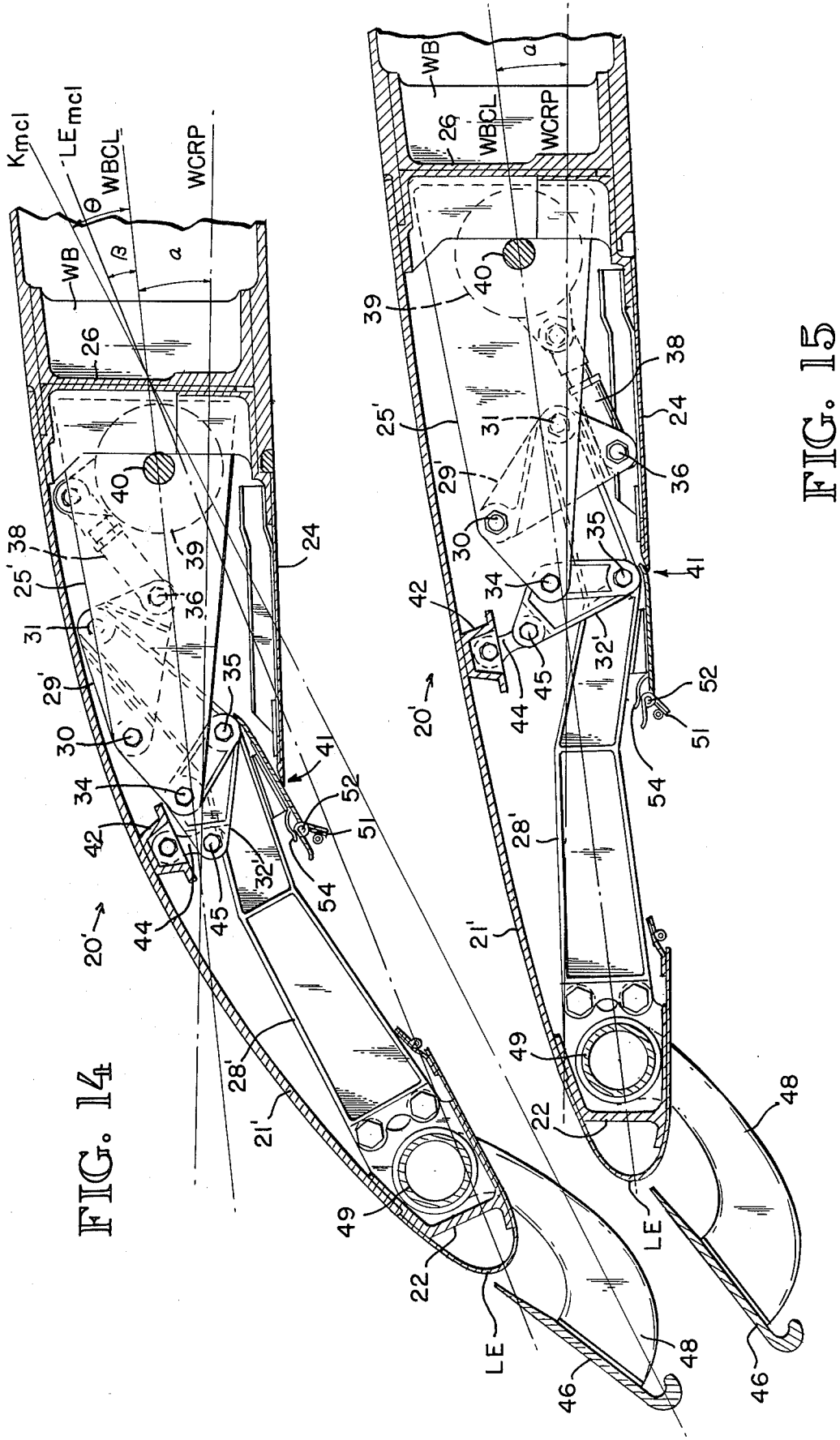

VARIABLE CAMBER LEADING EDGE MECHANISM WITH KRUEGER FLAP

RELATED APPLICATION

Frank D. Statkus, Ser. No. 142,121, filed Apr. 21, 1980, for "Continuous Skin Variable Camber Airfoil Edge Actuating Mechanism", now U.S. Pat. No. 4,351,502.

BACKGROUND OF THE INVENTION

1. Field of the Invention

The present invention relates generally to a continuous skin variable camber leading edge for airfoils; and, more particularly, to improved actuating mechanisms for such variable camber airfoils which are characterized by their simplicity, rigidity and stability, yet which permit of deployment of Krueger flaps to meet specific operating requirements and which permit attainment of optimized aerodynamic airfoil configurations and/or reconfigurations: (i) without compromising structural wing box design and/or placement; (ii) without requiring the upper continuous airfoil flexible skin to contribute to the load bearing support provided by the actuating linkage; (iii) without the need for the actuating members to project out of the desired optimized aerodynamic contour of the airfoil irrespective of the degree of leading edge deflection; and (iv), without the need to locate sliding joints or similar discontinuities in the flexible upper skin of the airfoil except under such conditions where the Krueger flaps are deployed as "slotted" Krueger flaps as contrasted with "sealed" Krueger flaps.

In the design of airfoils—especially in light of today's highly advanced state of aircraft technology—many differing, and sometimes conflicting, design considerations must be taken into account such, merely by way of example, as the operating conditions to which the aircraft is to be subjected—e.g., subsonic, transonic and/or supersonic inflight conditions, as well as the specific operating conditions required during take-off and landing. Each different set of operating conditions presents its own special and, ofttimes, unique problems in terms of desired and/or required airfoil performance characteristics. However, common to the problems of efficient and effective airfoil design is the continuing need to design improved actuating mechanisms for varying the camber of the airfoil or, at least, the leading edge of the airfoil, in a smooth, efficient manner so as not to induce flow separation at localized regions on the surface of the airfoil, yet wherein the variable camber portion of the airfoil can be readily deployed to any desired operating position. At the same time, however, in many applications it is essential that the actuating mechanisms for the deflectable leading edge of the airfoil be such as to permit accommodation of deployable and stowable leading edge Krueger flaps or the like which are capable of being deployed in either a "slotted" or "sealed" configuration.

Those skilled in the art will appreciate that most conventional airfoil designs in use today—irrespective of whether intended for aircraft having subsonic, transonic and/or supersonic capability, and/or whether the aircraft is intended for commercial or other types of usage—require a rigid structural wing box which generally occupies at least 40% of the chord-wise dimension of the airfoil; such wing box serving to provide structural rigidity for the airfoil, primary structural frame members for attachment of leading edges, trailing edges and/or ailerons, as well as storage space for fuel. However, since trailing edge flaps, ailerons and actuating members therefore also commonly require 40% of the chord-wise dimension of the airfoil, this leaves only on the order of 20%, or less, of the airfoil's chord-wise dimension to accommodate leading edge flaps and actuating mechanisms therefore, as well as actuating mechanisms for varying the camber of the airfoil's leading edge. These conflicting demands for space have, prior to the advent of the present invention, mandated compromise on the part of the designer—i.e., a specific airfoil design has generally been required for each differing specific operational condition. That is, if, for example, high lift, low speed performance characteristics are required, separate flaps are commonly provided which often result in skin surface discontinuities that can deleteriously affect airfoil performance and which have commonly required complex actuating mechanisms. Alternatively, where separate flaps cannot be tolerated, the designer is forced to make some other compromise such, for example, as limiting the degree of permissible flap deflection, permitting actuating members to project out of the optimum airfoil contour or envelope, and/or permitting the actuating mechanism to penetrate into the critical area desirably reserved for the rigid structural wing box. The present invention obviates the need for many of such compromises.

From the standpoint of design and/or operating desideratum, a number of points are of primary interest. These include, for example, a variable camber system wherein: (i) the actuating mechanism is compatible with a wide range of airfoil designs and does not denigrate or otherwise compromise such requisite structural considerations as wing box location and/or extent; (ii) the actuating mechanism is capable of providing a rigid airfoil structure at each different operating position and wherein load paths are maintained both simple and short; (iii) the variable camber control linkage mechanism is stable at all operating positions and essentially derives no strength from the skin—that is, wherein the airfoil skin is not required to contribute to the load bearing support provided by the linkage mechanism; (iv) the actuating linkage for the variable camber leading edge permits of negative (down) deflection through a maximum range of desired rotational angles while maintaining a smoothly continuous skin surface having a relatively constant curvature consistent with desired aerodynamic contours; and (v), the actuating linkage for the variable camber leading edge permits of both stowage and deployment of leading edge "slotted" or "sealed" Krueger flaps during take-off and/or landing operations or for purposes of functioning as a speed-brake during either high speed or low speed inflight operating conditions.

2. Description of the Prior Art

Many attempts have been made in the past to provide variable camber airfoil surfaces which meet certain selected design requirements and operational parameters. Such prior art attempts have involved many different approaches and have met with varying degrees of success. An early typical approach involved the use of "slip joints" and/or similar sliding joints or overlapping skin surfaces having the ability to "grow" and/or "shrink" as the degree of airfoil camber is increased and decreased. However, the design of such systems has commonly required the elimination of, or significant alteration of, the airfoil wing box. Because rigid wing box designs are eliminated or significantly altered, poor structural load paths result; and, often, the skin itself has been required to function as a principal load bearing element. Moreover, in such systems, undesired flow separation is commonly produced at the skin surface discontinuities in the regions of the slip joints or other overlapping flap arrangements. As a result of such limitations, this type of apparatus has generally been limited to usage where the airfoil need only operate in low dynamic pressure regions.

Typical prior art aproaches involving "slip joints" or other overlapping flap constructions wherein the skin surface of the airfoil is characterized by one or more surface discontinuities are illustrated in, for example: British Provisional Pat. No. 103,400, Jan. 25, 1917 (a slip joint arrangement and actuating linkage for use in trailing edges); U.S. Pat. No. 1,567,531—Magni (a discontinuous lap joint and actuating linkage for varying camber throughout all or selected portions of the chordwise dimension of an airfoil); U.S. Pat. No. 1,868,748—Hogan (a discontinuous lap joint and actuating linkage for leading and/or trailing edges); U.S. Pat. No. 3,179,357—Lyon (a slip joint and actuating linkage for trailing edges); U.S. Pat. No. 4,012,013—Ball et al (a slip joint and actuating linkage for an inlet ramp on supersonic aircraft); and, U.S. Pat. No. 4,040,579—McKinney (a slip joint arrangement and actuating linkage for use in leading edges). Other types of mechanisms disclosed in the prior art for varying camber along all or a substantial portion of the chord length of the airfoil are disclosed in U.S. Pat. Nos. 1,828,981—Parker, 1,886,362—Antoni, 2,022,806—Grant, and 3,716,209—Pierce.

In general, all of the foregoing proposed constructions result in one or more of: (i) flow separation at localized areas of the skin surface discontinuities; (ii) elimination or substantial reduction of the structural airfoil wing box with consequent denigration of structural load paths; (iii) lack of rigidity and stability of the actuating mechanism; (iv) a requirement that the skin of the airfoil function as a principal load bearing element; and/or (v), excessive undesired skin flutter which severely alters the performance characteristics of the airfoil. As a consequence, this type of construction has generally been limited to airfoils used in low dynamic pressure regions.

The use of separate flaps such, for example, as the use of Krueger flaps at an airfoil leading edge has been disclosed in U.S. Pat. No. 3,504,840—Cole. This type of construction is commonly characterized by discontinuities in the upper skin surface of the airfoil which characteristically produce flow separation and has not generally been found suitable for cruise camber control but, rather, has been limited to usage as a low speed, high lift device of the type commonly employed in take-off and/or landing operational modes. Nevertheless, such separate Krueger flaps or the like do find advantageous application in take-off and/or landing modes, as well as functioning as speedbrakes during inflight cruise operations and are, therefore, commonly a desirable adjunct for airfoil leading edges of both the variable camber and fixed camber type.

Efforts to overcome the problems associated with discontinuities in the upper skin surface have contemplated the usage of variable camber leading and/or trailing edges wherein the airfoil employs a flexible skin which is subjected to rather sharp deflection in a highly localized region such, for example, as the arrangement disclosed in U.S. Pat. Nos. 1,763,888—Griswold, II, and 2,749,060—Brady et al. See, also, U.S. Pat. No. 2,650,047—Carhart et al. Because of the relatively sharp skin deflection in a localized region, such attempts have failed to solve the problem of flow separation—i.e., the sharp localized deflection area, although a continuous skin surface, still functions as a significant curvature discontinuity which produces flow separation. Moreover, in such constructions the airfoil skin is subjected to significant stress and, this fact places severe constraints on the degree of deflection permitted.

Other types of variable camber systems employing either continuous or discontinuous upper skin surfaces are those disclosed in, for example: U.S. Pat. Nos. 2,763,448—Davie, Jr.; 3,836,099—O'Neill et al; 3,941,334—Cole; 3,994,451—Cole; 3,994,452—Cole; and 4,053,124—Cole. These types of camber control arrangements commonly employ relatively complex linkages or, linkage mechanisms which project out of the aerodynamic contour of the airfoil. In the aforesaid Cole U.S. Pat. No. 3,941,334, undesirable surface discontinuities are present on both the upper and lower skin surfaces of the airfoil leading edge. Moreover, such prior art constructions provide only limited camber control and commonly violate wing box integrity. As a result of these problems, aircraft employing such control mechanisms are commonly limited to operation in low dynamic pressure regions.

Among the more relevant of the prior art proposals of which the inventors and the inventors' assignee are presently aware are those disclosures in Zapel U.S. Pat. Nos. 4,131,253 and 4,171,787, assigned to the assignee of the present invention, which respectively disclose continuous flexible skin variable camber arrangements for airfoil trailing edges and airfoil leading edges. In these patent disclosures, while the flexible airfoil skin assumes a relatively constant smooth curvature devoid of interruptions throughout the regions of airfoil deflection, the arrangements fail to obviate some of the more perplexing problems in variable camber airfoil design. Thus, the upper flexible skin surface is unsupported in all but the position of maximum deflection, thereby resulting in undesired "skin flutter"; only limited deflection is obtained—e.g., in the range of up to 15° to 16° negative deflection for either a leading edge (U.S. Pat. No. 4,171,787) or a trailing edge (U.S. Pat. No. 4,131,253); the actuating linkage mechanism disclosed requires the use of cam grooves and followers which, because of their requisite and inherent "loose fits", produce undesired "flap flutter" or chatter in addition to, and distinct from, the problem of "skin flutter" discussed above; and, such actuating linkages tend to impinge upon wing box integrity, particularly in the regions of the cam rollers, followers and slideways which project into the regions where the leading and trailing spars of a wing box are desirably located. Moreover, the number of individual links required and the arrangements for pivotally interconnecting such links tends to increase the length and complexity of load paths. Because of the foregoing disadvantages, variable camber trailing and/or leading edges of the types disclosed in the aforesaid Zapel patents are generally limited to usage in relatively low speed operating modes.

Perhaps the most relevant of the known approaches relating to variable camber leading edges is the approach disclosed in the aforesaid copending application of Frank D. Statkus, Ser. No. 142,121, filed Apr. 21, 1980, now U.S. Pat. No. 4,351,502, assigned to the assignee of the present invention. In this copending application, there has been disclosed a continuous skin variable camber airfoil edge actuating mechanism which can be employed for either or both of an airfoil leading or trailing edge and which is capable of achieving leading edge negative (down) deflections up to on the order of 23° with respect to the wing chord reference plane, trailing edge negative (down) deflections up to on the order of 32°, leading edge positive (up) deflections of up to on the order of 3°, and trailing edge positive (up) deflections of up to on the order of 6°, while maintaining constant curvature of the smooth, continuous uninterrupted flexible upper skin of the airfoil. The particular actuating linkage employed requires the use of multiple pairs of 4-bar linkages for each of the deflectable airfoil edges and does not permit of stowage and/or deployment of leading edge Krueger flaps or the like.

SUMMARY OF THE INVENTION

Accordingly, it is a general aim of the present invention to provide an improved actuating mechanism suitable for use with continuous skin variable camber leading edges for airfoils which overcomes the foregoing disadvantages inherent in conventional prior art variable camber control mechanisms and which permits changing airfoil contours to obtain optimum aerodynamic performance from a wide variety of different types of aircraft at various combinations of air speed, altitude and angles of attack; yet, which readily permits of both stowage and deployment of leading edge Krueger flaps for use as speedbrakes during both high speed and low speed inflight cruise conditions, as well as during landing and take-off operational modes.

More specifically, the invention has as one of its principal objectives the provision of continuous skin variable camber control mechanisms characterized by their simplicity and reliability in operation, as well as by their adaptability to a wide range of airfoil design configurations, and which permit of optimal deflection of the variable camber leading edge of the airfoil through maximum operating ranges so as to enable the airfoil to be configured or, indeed, rapidly reconfigured in flight, to obtain optimum aerodynamic performance characteristics for operation at subsonic, transonic and/or supersonic operating modes. As a result of attaining these objectives, substantial improvements can be achieved in terms of payload ranges, maneuverability, and quality of ride.

A further general objective of the invention is the provision of an improved, simple, yet highly effective control actuating mechanism for variable camber airfoils which permits varying the leading edge camber of continuous skin airfoils through a relatively wide range of deflection angles and wherein the degree of curvature of the deflected flexible skin surface remains substantially constant throughout the region of deflection for any given deflection angle, thereby insuring smooth, uniform uninterrupted airflow over the contour of the airfoil and attainment of optimized aerodynamic efficiencies and characteristics over a wide range of operating speeds and conditions.

It is a more specific, but highly important, objective of the invention to provide an improved actuating mechanism for varying the camber of continuous skin airfoils through a relatively wide range of deflection angles characterized by its simplicity, compactness, rigidity, stability and reliability, which permits of freedom of aircraft operation in virtually all conceivable dynamic pressure regions, and which readily permits of leading edge deflection angles ranging up to on the order of 22° as measured with respect to the wing box chord line without deployment of a Krueger flap, or effective leading edge deflection angles of up to on the order of 32° when the Krueger flap is deployed; and, wherein the simplicity of the variable camber leading edge actuating mechanism readily permits of both stowage and deployment of Krueger flaps and the like.

In one of its more detailed aspects, it is an object of the invention to provide an improved actuating mechanism for a continuous skin variable camber airfoil which permits deflection of the leading airfoil edge to any desired position; yet, which provides positive skin support and remains rigid and stable at all operating positions, thereby insuring elimination of skin and/or flap flutter which tend to reduce aerodynamic performance characteristics.

Another objective of the invention is to provide improved actuating mechanisms for continuous skin variable camber airfoils which are characterized by short, simple load paths between the deflectable leading edge structure and the main airfoil support frame, and wherein the airfoil skin is not required to contribute to the load bearing support function provided by the actuating linkage and is not subjected to appreciable chordwise stress resulting from motion of the actuating linkage.

DESCRIPTION OF THE DRAWINGS

These and other objects and advantages of the present invention will become more readily apparent upon reading the following detailed description and upon reference to the attached drawings, in which:

FIG. 3 is a sectional view similar to FIG. 2, but here illustrating the Krueger flap deployed as a "slotted" Krueger flap and defining an effective included leading edge angle with the wing box chord line on the order of about 22.5°;

FIG. 4 is a fragmentary sectional view similar to FIG. 3, but here illustrating a modified Krueger flap arrangement in which the flap is deployed as a "sealed" Krueger flap assembly;

FIG. 10 is a diagrammatic, highly simplified fragmentary plan view illustrating in generalized form a typical actuation system for varying the camber of an airfoil leading edge and/or for deploying leading edge Krueger flaps or the like;

FIG. 11 is a sectional view similar to FIG. 1, but here illustrating a slightly modified form of the actuating linkage incorporating features of the present invention;

FIG. 12 is a sectional view similar to FIG. 2, here illustrating the modified actuating mechanism depicted in FIG. 11 with the leading edge in its fully deflected position;

FIG. 13 is a fragmentary sectional view similar to that shown in FIG. 5, but here illustrating the Krueger flap deployed as a speedbrake in an airfoil employing an actuating mechanism of the type shown in FIGS. 11 and 12;

FIG. 14 is a sectional view of the variable camber leading edge of an airfoil employing the actuating mechanism of FIG. 11, here illustrating the airfoil in its fully deflected position with the Krueger flap fully extended; and, FIG. 15 is a view similar to FIG. 14, but here illustrating the Krueger flap extended when the airfoil leading edge is in the undeflected configuration.

Figure 1:
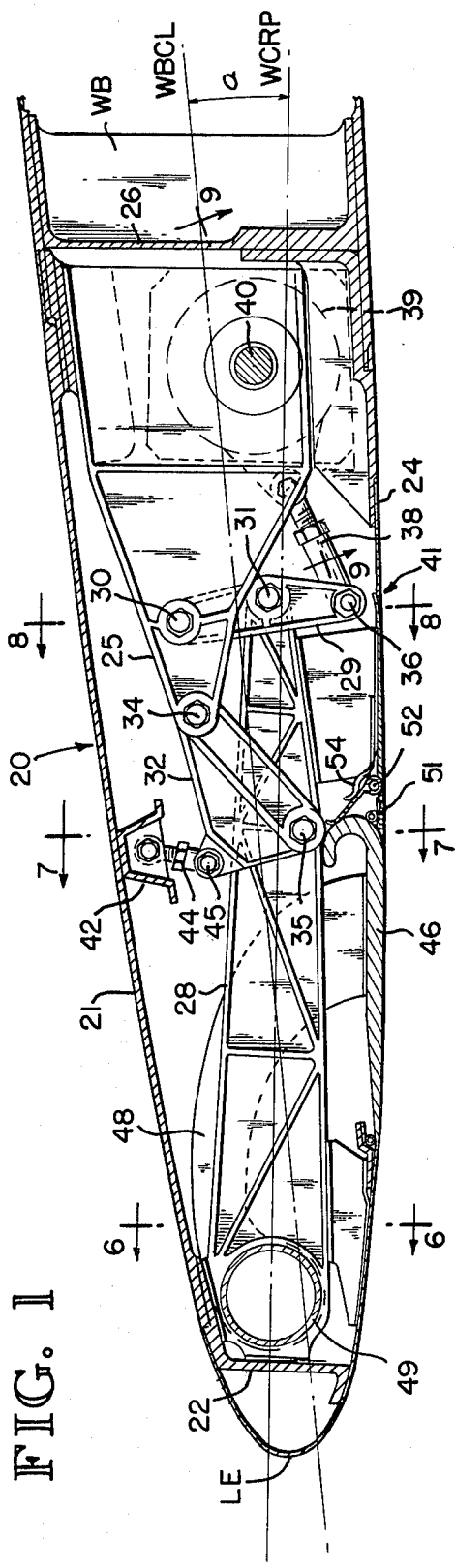
FIG. 1 is a sectional view of a leading edge variable camber section of a flexible continuous skin airfoil employing an actuating mechanism in accordance with the present invention, with the sectional view here taken transverse to the span-wise axis of the airfoil, and showing the airfoil leading edge in its cruise or undeflected position.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

Referring first to FIG. 1, there has been illustrated a fragmentary portion of an airfoil, generally indicated at 20, having a relatively thin wing loft and comprising essentially that portion of the airfoil disposed forward of a conventional structural wing box. As here shown, the airfoil 20 includes a leading edge LE, a trailing edge TE (FIG. 10), and a centrally disposed wing box WB. A continuous upper flexible skin 21 is fixedly secured at its forward end to an auxiliary leading edge spar or structural member 22; and, is fixedly secured to the wing box WB aft of the leading edge LE, with such skin extending rearwardly towards the airfoil's trailing edge TE and trailing edge flap assemblies (not shown in detail). The airfoil 20 is further provided with a lower skin 24 which extends from the leading edge spar 22 rearwardly, such lower skin also being secured to the wing box WB. Thus, the wing box WB, leading edge spar 22, and upper and lower skins 21, 24 define a relatively thin aerodynamically streamlined airfoil contour or envelope which, in most conventional aircraft, is limited to the leading 20%, or less, of the chordal extent of the airfoil; and, it is within such leading edge envelope that all of the actuating mechanisms for causing leading edge deflection and/or deployment of leading edge flaps must be located.

In accordance with one of the important aspects of the present invention, there has been provided a simple, compact actuating mechanism (which here takes the form of a multiplicity of span-wise spaced, essentially identical 4-bar actuating linkages) for deflecting the leading edge LE of the airfoil 20 through a relatively wide range of leading edge deflection angles; yet, which readily permits of both stowage and deployment of leading edge flaps such, for example, as Krueger flaps. Since each of such 4-bar actuating linkages are essentially identical in construction and mode of operation, a description of one such linkage assembly should suffice for purposes of an understanding of this exemplary form of the invention. Thus, and as best illustrated by reference to FIGS. 1 and 2 conjointly, it will be noted that this exemplary actuating linkage includes: (i) first structural rib defining means 25 rigidly secured to, and projecting forwardly from, the airfoil's front spar or leading structural main frame 26 which extends in a span-wise direction through the airfoil 20 and defines the leading structural spar of the wing box WB; (ii) a rigid beam-like drive fitting 28 which is secured to the auxiliary leading edge spar 22 and extends rearwardly therefrom, and which has its chordal centerline substantially coincident with the wing chord reference plane WCRP when in the undeflected state; (iii) first generally upright link defining means 29 having its upper end pivotally secured at 30 to the structural rib defining means 25, and its approximate mid-point pivotally secured at 31 to the rearmost end of drive fitting 28; and (iv), second generally upright link defining means 32 having its upper end pivotally connected at 34 to the forward extremity of structural rib defining means 25, and its lower extremity pivotally connected at 35 to the drive fitting 28 at a point intermediate its opposite ends.

The pivotal connections 30 and 34 of links 29 and 32, respectively, to the airfoil's fixed structural rib 25 comprise "hard" or fixed pivot points between the actuating linkage and the airfoil's structure, while all other pivotal connections comprise "floating" pivots. Thus, the structural rib defining means 25, drive fitting 28 and link defining means 29, 32 collectively define a 4-bar actuating linkage for causing controlled deflection of the leading edge LE of the airfoil 20 with respect to the wing chord reference plane WCRP and with respect to the wing box chord line WBCL. As is conventional with this illustrative type of airfoil, the wing chord reference plane WCRP and wing box chord line WBCL define an included angle $\alpha$ which is representative of the camber of the airfoil 20 when the leading edge LE is in its undeflected state as shown in FIG. 1. In the illustrative device of FIG. 1, the angle $\alpha$ is on the order of 6.5°.

To effect controlled deflection of the leading edge LE of the airfoil 20, the first generally upright link defining means 29 in this illustrative form of the invention comprises a drive crank having its lower extremity pivotally connected at 36 to a drive link 38 coupled to a suitable actuator which here takes the form of a rotary actuator 39 having a span-wise oriented drive shaft 40 mounted on, and carried by, the front spar 26. As best illustrated by reference to FIGS. 1 and 2 conjointly, it will be appreciated that when the rotary actuator 39 is driven (in a clockwise direction as viewed in the drawings) by drive shaft 40, the drive link 38 serves to pivot the first upright link defining means 29 or drive crank rearwardly in a counter-clockwise direction about the hard pivot point 30 between the drive crank 29 and rib 25 from the position shown in FIG. 1 to the position shown in FIG. 2; thereby retracting the beam-like drive fitting 28 in a rearward direction. As the drive fitting 28 moves rearwardly, the second generally upright link defining means 32 pivots in a counter-clockwise direction about the hard pivot point 34 between link 32 and rib 25, thus serving to deflect the leading edge LE of the airfoil 20 from the position shown in FIG. 1 to the solid line position shown in FIG. 2, thereby defining a leading edge deflection angle $\beta$ which, for purposes of consistency, is herein defined as comprising the included angle between the wing box chord line WBCL and the leading edge mean camber line $LE_{mcl}$. As the airfoil's leading edge LE is deflected, a slip joint or lower skin splice, generally indicated at 41, permits the aft portion of the lower skin 24 and supporting airfoil structure to be retracted into the airfoil's leading edge envelope.

As the ensuing description proceeds, those skilled in the art will appreciate that while the present invention advantageously permits attainment of significant leading edge deflection angles $\beta$, the particular deflection angle achieved will vary widely dependent upon a wide range of variable parameters such, merely by way of example, as the length of the leading edge chord—i.e., the chordal distance between the spars 22 and 26—the thickness of the airfoil 20, the particular shapes and dimensions of the links 25, 28, 29 and 32, and the particular location of the pivot points 30, 31, 34 and 35. However, in the illustrative form of the invention depicted in FIGS. 1 and 2, it has been found that leading edge deflection angles $\beta$ on the order of about 15° may be readily attained; and, such leading edge deflection angles, together with the inherent airfoil camber angle $\alpha$, provide an overall leading edge deflected camber of up to on the order of about 22°.

Figure 2:
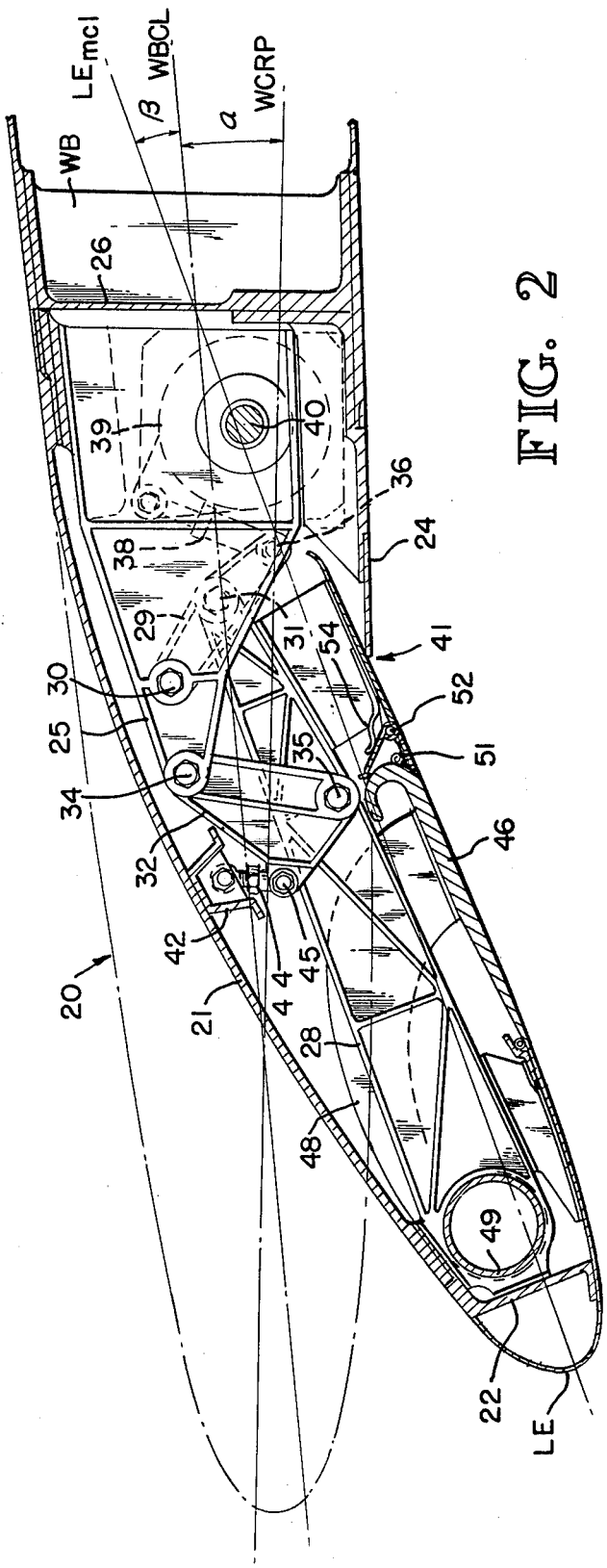
FIG. 2 is a vertical sectional view similar to FIG. 1, but here depicting the leading edge of the airfoil in its fully deflected position defining an included angle with the wing box chord line of on the order of about 15° and with the Krueger flap assembly here being illustrated in its inoperative or stowed position.

With the foregoing description of the motions of a typical 4-bar actuating mechanism 25, 28, 29 and 32 in mind, and upon reference to FIGS. 1 and 2, it will be noted that the upper flexible skin 21 of the airfoil 20 is supported at about the mid-point of its chordal dimension by means of a flexible panel support beam 42 which is pivotally connected through a slave link 44 to the forward link defining means 32 at its midpoint 45. The arrangement is such that during deflection of the variable camber leading edge portion of the airfoil 20, the chord-wise mid-point of the flexible upper skin 21 is maintained in a stable position of controlled constant curvature (preferably defining a segment of a circular arc) throughout its chord-wise length by support link 44 which is interconnected directly to the 4-bar linkage assembly; with the latter, and especially, links 28 and 32, providing load bearing support of the structural edge member 22—i.e., the skin 21 provides no load bearing support. Of course, although the curvature of the flexible skin portion 21 is maintained constant over its chord-wise length for any given leading edge deflection angle $\beta$, the degree of curvature will vary dependent upon the actual deflection angle. Not only does slave link 44 insure that proper constant curvature is maintained for given angular deflections but, in addition, the slave link 44 imparts sufficient structural stability to the flexible skin 21 as to effectively preclude skin flutter in all operative positions of the airfoil's leading edge LE. Thus, the upper skin surface 21 of the airfoil 20 is characterized at all operative positions of the variable camber surface, by a smooth, uninterrupted, continuous surface completely devoid of both surface discontinuities—i.e., relatively sliding flaps, etc.—and curvature discontinuities—i.e., highly localized deflection areas.

In carrying out the present invention, the simplicity of the 4-bar linkage mechanism 25, 28, 29 and 32 permits of sufficient space, even within relatively thin airfoils 20, to accommodate and store leading edge flaps such, for example, as Krueger flaps, one of which is indicated at 46 in FIGS. 1 and 2. Such Krueger flaps 46 are preferably carried by a plurality of Krueger fittings 48 or actuating arms which are spaced apart in a span-wise direction and which are drivingly connected to a span-wise oriented Krueger actuator in the form of a torque tube 49 rotatably carried by the auxiliary leading edge spar 22. When in the stowed position, the Krueger flaps 46 are disposed beneath the leading edge drive fitting 28 and define a portion of the lower skin surface 24 of airfoil 20.

Figure 6:
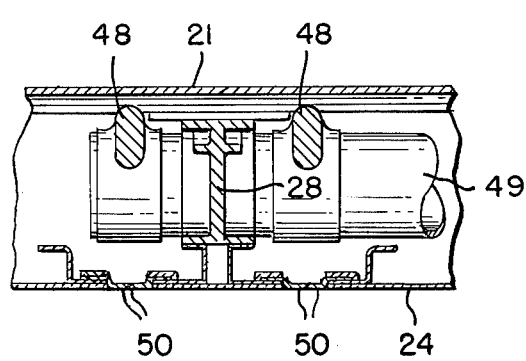
FIGS. 6, 7, 8 and 9 are, respectively, transverse sectional views taken substantially along the lines 6—6, 7—7, 8—8 and 9—9 in FIG. 1, here illustrating details of the simplified 4-bar linkage mechanism employed for deflecting the variable camber airfoil leading edge.
Figure 7:
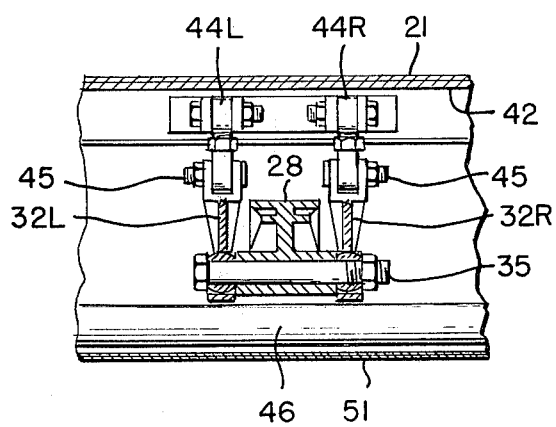
Figure 8:
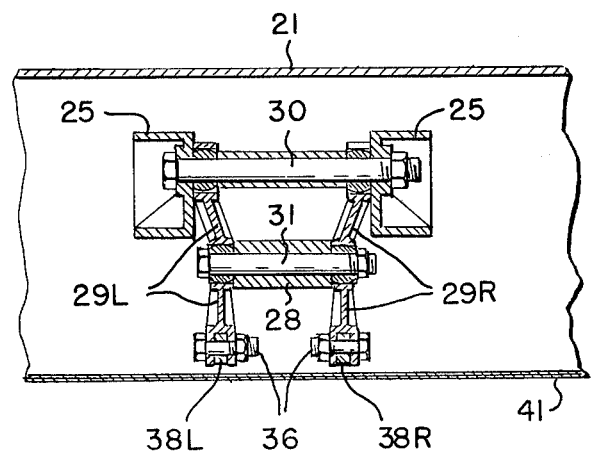
Figure 9:
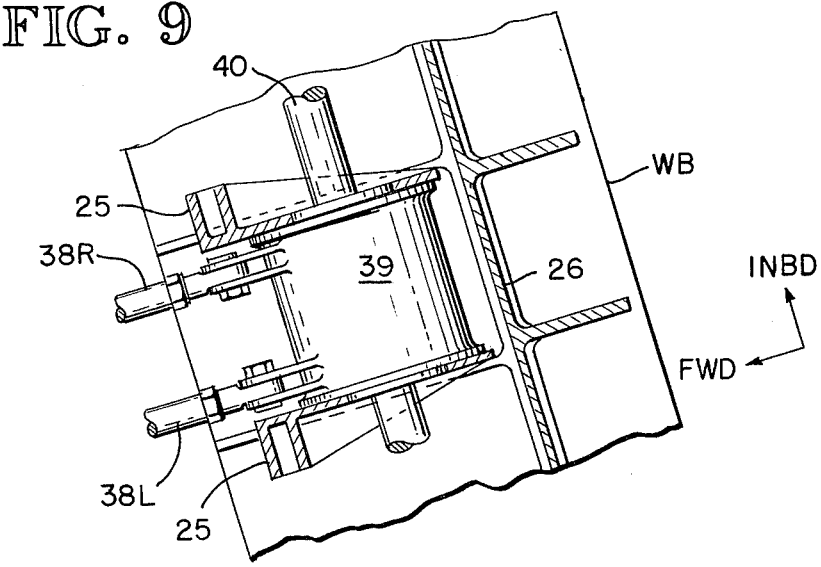

In operation, and as best observed by reference to FIGS. 2, 3 and 6 conjointly, it will be observed that upon actuation of the Krueger torque tube actuator 49 (i.e., upon rotation thereof in a clockwise direction as viewed in FIGS. 1, 2 and 3), the Krueger actuating arms 48 are rotated in a clockwise direction so as to move the Krueger flaps 46 from a stowed position within the airfoil envelope (FIG. 1 or 2) through any desired rotational angle up to a fully deployed position as shown in FIG. 3 where the Krueger mean camber line $K_{mcl}$ defines an included angle $\theta$ with the wing box chord line WBCL. In the illustrative device shown in FIGS. 1 through 3, the angle $\theta$ defines an effective leading edge deflection angle with the Krueger flaps 46 fully deployed of on the other of $22\frac{1}{2}$°. As the Krueger actuating arms 48 are pivoted in a clockwise direction as viewed in FIGS. 2 and 3, they pass through respective longitudinally oriented aerodynamic keyway seals 50 formed in the lower skin 24, as best shown in FIG. 6.

In order to provide a smooth aerodynamic surface in the lower airfoil skin surface 24 when the Krueger flaps 46 are stowed, a "U"-shaped release flipper 51 is pivotally mounted at 52 on the airfoil's lower wing structure, with such flipper assembly being normally biased towards the open position by means of a blade spring 54. Thus, the arrangement is such that when the Krueger flaps 46 are deployed from the stowed position shown in FIG. 1 or 2, clockwise movement of the flaps 46 causes the release flipper 51 to be pivoted downwardly about pivot point 52 in a counter-clockwise direction, with the release flipper being maintained in its downward position by means of the spring forces imposed by blade spring 54. During retraction of the Krueger flaps 46 from the position shown in FIG. 3 to the stowed position shown in FIG. 1 or 2, the Krueger flaps engage the inboard side of the generally "U"-shaped release flipper 51, rotating the flipper in a clockwise direction against the biasing force provided by spring 54 and thereby establishing a smooth, substantially uninterrupted continuous skin surface in the region of the Krueger flaps on the under surface of the airfoil 20.

In this form of the invention, it will be observed that the Krueger flaps 46 are deployed as "slotted" Kruegers defining a span-wise slot, generally indicated at 55 in FIG. 3, between the trailing edges of the flaps 46 and the leading edge LE of the airfoil 20. However, in its broader aspects, the present invention permits of modification of the Krueger flaps 46' and their actuating assembly 48', 49' so that the Krueger flaps may be fully deployed in a "sealed" position such as shown in FIG. 4 wherein any gap discontinuity between the trailing edges of the flaps 46' and the leading edge LE of the airfoil 20 is substantially closed.

Figure 5:
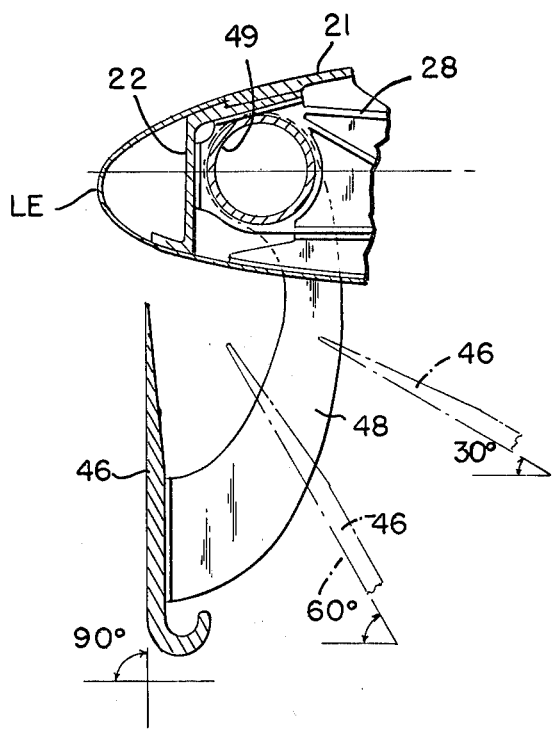
FIG. 5 is a fragmentary sectional view similar to FIG. 1 here illustrating the leading edge of the airfoil in the undeflected condition with the Krueger flap deployed at an angle of 90° with respect to the wing chord reference plane, a condition that might be employed to achieve maximum speed braking under low speed flight conditions.

Those skilled in the art will readily appreciate that the provision of a Krueger flap assembly permits usage of the flaps 46 as an inflight speedbrake having a modulating range of from 0° through 90°. Thus, referring to FIG. 5, the Krueger flaps 46 are shown in solid lines as deployed at an angle of 90° with respect to the wing chord reference plane WCRP, a position suitable for use with low speed flight operating conditions. At relatively higher speeds, the Krueger flaps 46 may be deployed to lesser included angles such, for example, as the 30° and 60° angles indicated in phantom in FIG. 5, thereby permitting usage of the Krueger flap assembly as an inflight speedbrake under either high or intermediate speed flight operating conditions.

In carrying out the present invention, and as best illustrated by reference to FIGS. 1, 7, 8 and 9 conjointly, it will be noted that the generally upstanding first and second link defining means 29, 32 comprise pairs of left and right first links 29L, 29R (FIG. 8), and pairs of left and right second links 32L, 32R (FIG. 7), which respectively straddle the beam-like leading edge drive fitting 28. Thus, the arrangement is such that when the rotary actuator 39 is actuated by any suitable means through the drive shaft 40, rotational movement is transmitted via a pair of left and right drive links 38L, 38R (FIGS. 8 and 9) to the pair of left and right first link defining means or drive cranks 29L, 29R which are pivotally connected at 31 to, and straddle, the beam-like drive fitting 28. As the beam-like drive fitting is pivoted about hard pivots 30 and 34, the forward link defining means 32L, 32R serve to transmit leading edge LE loading through the drive fitting 28 to the structural rib defining means 25, and thence to the wing box structure WB.

Figure 10:
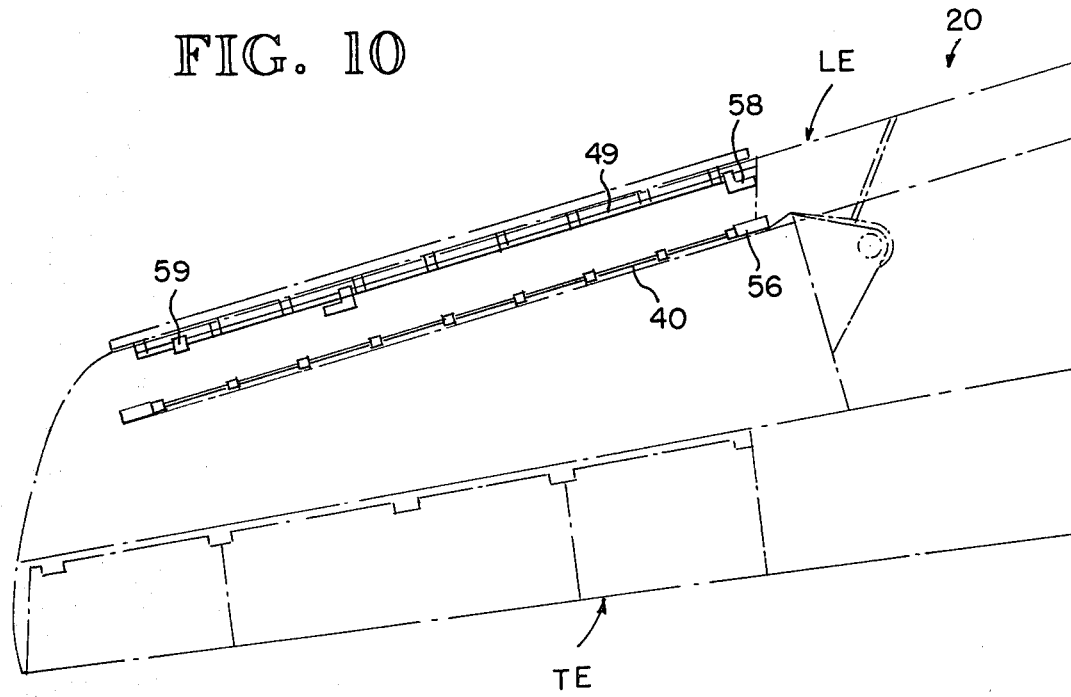

Referring to FIG. 10, there has been illustrated in highly generalized fashion an exemplary actuating system for transmitting rotational forces to the drive shaft 40 associated with a plurality of span-wise spaced 4-bar linkage assemblies and to the Krueger flap torque tube actuator 49. Thus, as here shown, rotational forces may be imparted to the drive shaft 40 for a plurality of span-wise spaced 4-bar leading edge actuator linkages by means of any suitable conventional power drive unit 56 which may, for example, take the form of an hydraulic or electric motor of the like. Similarly, a second power drive unit 58 of conventional construction may be provided for imparting rotational power to the torque tube 49 for actuating a multiplicity of span-wise oriented side-by-side Krueger flaps 46. Moreover, conventional brake means, generally indicated at 59, may be provided for braking the torque tube actuator 49, and thus maintaining the deployed Krueger flaps 46 in position during inflight operations and irrespective of aerodynamic loading of the flaps. Thus, the leading edge LE of airfoil 20 may be selectively deflected through any desired operating deflection angle $\beta$, while the Krueger flaps 46 may be selectively stowed (FIGS. 1 and 2), or deployed fully (FIGS. 3 and 4) or partially (FIG. 5), yet wherein leading edge deflection angles and Krueger flap deployment are separately and independently controlled. Nevertheless, the 4-bar actuating linkage provided for airfoil leading edge deflection does not interfere with nor preclude either storage or deployment of the leading edge Krueger flaps 46.

Turning now to FIGS. 11 through 15, there has been illustrated a slightly modified airfoil 20' together with a slightly modified 4-bar actuating mechanism for causing angular deflection thereof. In general, however, the two systems depicted in, for example, FIGS. 1 and 11 employ basically the same components which function in essentially the same way; and, therefore, those components have been given the same reference numbers in the embodiment of FIGS. 11 through 15 as were employed in the embodiment of FIGS. 1 through 3. The principal differences between the two illustrative forms of the invention reside in the fact that in the embodiment of FIGS. 11 through 15: (i) the distance between the auxiliary leading edge spar 22 and the main leading structural spar 26 is somewhat greater and, therefore, the upper skin designated by the reference numeral 21' is somewhat longer in chordal extent; (ii) the airfoil is slightly thinner; and (iii), the shapes, dimensions and angulation of the four links defining the 4-bar actuating linkage are slightly different. Consequently, such four links have been designated by the reference numerals 25', 28', 29' and 32'. However, it will be understood by those skilled in the art that the 4-bar linkage assembly 25', 28', 29' and 32' operates in essentially the same way as the 4-bar linkage assembly 25, 28, 29 and 32 shown by way of example in FIG. 1. The location of the pivot points and the angulation selected for the links has been modified slightly in order to optimize leading edge deflection angles and to compensate for the longer thinner leading edge envelope or airfoil contour.

It has been found that the particular embodiment of the invention depicted by way of example in FIGS. 11 through 15 permits of somewhat higher leading edge deflection angles $\beta$ which here can be on the order of about 15.5°. Those skilled in the art will, of course, appreciate that the particular attainable maximum leading edge deflection angles with any given airfoil embodying the present invention will vary dependent upon the chordal extent of the leading edge envelope, the thickness thereof, the length and shape of the four links defining the 4-bar linkage assembly, and the particular location of the pivot points 30, 31, 34, 35 and 36 together with the angulation selected for the links. Indeed, in some instances where Krueger flaps are not required, leading edge deflection angles $\beta$ on the order of up to 22° can be attained.

Thus, those skilled in the art will readily appreciate that there have herein been disclosed various modifications of a simple 4-bar actuating mechanism for deflecting the leading edge of an airfoil and which readily permit accommodation of Krueger flaps in both the stowed and deployed positions; yet, wherein all of the actuating components of the 4-bar actuating mechanism are confined entirely within the leading edge airfoil envelope at all operative positions of the leading edge. The need to provide "slip joints" or other overlapping flap constructions on the airfoil's upper skin surface is eliminated. The short simple load paths defined by the actuating linkage serve to transmit aerodynamic loading of the leading edge directly to the airfoil's main structural components; and, consequently, the upper continuous flexible skin is not required to serve any load bearing support function. The provision of a span-wise oriented flexible skin support beam which is positively interconnected to the actuating linkage serves to impart stability and rigidity to the flexible skin at all operative positions of the variable camber airfoil leading edge, thus minimizing the problems of skin flutter.

What is claimed is:
1. A variable camber airfoil of the type having a leading edge and a trailing edge and defining a wing chord reference plane passing through the leading and trailing edges, comprising, in combination:
  (a) a rigid, centrally located, span-wise structural wing box including means defining a leading structural main frame;
  (b) a leading structural span-wise edge member spaced forwardly from said wing box main frame;
  (c) a continuous upper flexible skin secured to said leading structural edge member and said structural wing box;
  (d) lower skin surface defining means secured to said leading structural edge member and said structural wing box with said upper skin and said lower skin surface defining means defining an airfoil envelope;
  (e) a structural rib rigidly secured to said leading structural main frame and projecting forwardly towards said leading structural edge member;
  (f) a rigid beam-like drive fitting secured to said leading structural edge member and projecting rearwardly towards said leading structural main frame, said drive fitting having its chord-wise centerline generally coincident with said wing chord reference plane when said leading structural edge member is in its normal undeflected state;
  (g) first generally upright link defining means pivotally connected at its upper end to said structural rib intermediate said leading structural main frame and the forward extremity of said structural rib, said first link defining means being pivotally connected to said drive fitting adjacent the rearmost extremity thereof and defining a drive crank;
  (h) second generally upright link defining means pivotally connected adjacent its upper end to said structural rib adjacent the forward extremity thereof and forward of the point of pivotal connection of said first link defining means to said structural rib, said second link defining means being pivotally secured to said drive fitting at a point intermediate its opposite ends and forward of said pivotal connection between said first link defining means and said drive fitting; and,
  (i) actuating means coupled to said drive crank for pivoting said first link defining means about its point of pivotal connection to said structural rib between a first forward position where said leading structural edge member is in the non-deflected position coincident with said wing chord reference plane and a second rearward position where said leading structural edge member is in a deflected position with respect to said wing chord reference plane, and wherein said structural rib, said drive fitting and said first and second generally upright link defining means are all confined entirely within said airfoil envelope at all operative positions of said variable camber airfoil leading edge.

2. A variable camber airfoil as set forth in claim 1 further including means defining leading edge flaps mounted within said airfoil envelope with freedom for rotation between a first stowed position located beneath said drive fitting and within said envelope and a second deployed position wherein said leading edge flap defining means are extended to an operative position outside of said envelope, and second actuating means are provided for rotating said leading edge flap defining means between said first stowed position and said second deployed position.

3. A variable camber airfoil as set forth in claim 2 wherein the flaps defined by said leading edge flap defining means are Krueger flaps.

4. A variable camber airfoil as set forth in claim 1 wherein the wing box chord line extending through said airfoil defines an angle $\alpha$ with said wing chord reference plane and the leading edge mean camber line extending through said leading edge when deflected defines a leading edge deflection angle $\beta$ with said wing box chord line, and wherein said leading edge deflection angle $\beta$ ranges between 0° and about 22°.

5. A variable camber airfoil as set forth in claim 2 wherein the wing box chord line extending through said airfoil defines an angle $\alpha$ with said wing chord reference plane, the leading edge mean camber line extending through said leading edge when deflected defines a leading edge deflection angle $\beta$ with said wing box chord line, the leading edge flap mean camber line extending through said flap defining means when deployed defines an angle $\theta$ with said wing box chord line, and wherein said leading edge deflection angle $\beta$ ranges between 0° and about 15.5° and said angle $\theta$ ranges between 0° and about 32°.

6. A variable camber airfoil as set forth in claim 1 wherein said actuating means comprises a power driven rotary actuator.

7. A variable camber airfoil as set forth in claim 2 wherein said second actuating means comprises a power driven rotary actuator.

8. A variable camber airfoil as set forth in claims 1 or 2 wherein third generally upright link defining means are pivotally interconnected at one end to said second link defining means and at the other end to said continuous upper flexible skin at about the midpoint thereof between said main frame and said leading structural edge member for imparting stability and rigidity to said upper skin and for maintaining said upper skin in a smooth continuous aerodynamically streamlined airfoil configuration at all operative positions of said variable camber airfoil leading edge.

9. A variable camber airfoil as set forth in claims 1 or 2 wherein said first generally upright link defining means comprises left and right links straddling said drive fitting.

10. A variable camber airfoil as set forth in claims 1 or 2 wherein said second generally upright link defining means comprises left and right links straddling said drive fitting.

11. A variable camber airfoil as set forth in claims 1 or 2 wherein said first and second generally upright link defining means each comprise left and right links straddling said drive fitting.

12. A variable camber airfoil as set forth in claims 1 or 2 wherein the effective length of said second link defining means between its pivotal connections to said structural rib and said drive fitting is greater than the effective length of said first link defining means between its pivotal connections to said structural rib and said drive fitting.

13. A simple 4-bar actuating mechanism for deflecting the leading edge of a variable camber airfoil of the type including a wing chord reference plane, a rigid centrally located span-wise wing box defining a leading structural span-wise main frame, a leading structural span-wise edge member spaced forwardly of the main frame, a continuous upper flexible skin secured to the main frame and the edge member, and a lower skin secured to the main frame and the edge member and defining therewith and with the upper skin an aerodynamically streamlined airfoil leading edge envelope, said 4-bar actuating mechanism comprising, in combination:

(a) a first link comprising structural rib defining means rigidly secured to the leading structural main frame and projecting forwardly towards the leading structural edge member;

(b) a second link comprising a rigid beam-like drive fitting secured to the leading structural edge member and projecting rearwardly towards the leading structural main frame, said second link having its chord-wise centerline generally coincident with the wing chord reference plane when the leading structural edge member is in its normal undeflected state;

(c) third generally upright link defining means pivotally connected at its upper end to said first link intermediate the leading structural main frame and the forward extremity of said first link, said third link defining means being pivotally connected to said second link adjacent the rearmost extremity thereof and defining a drive crank;

(d) fourth generally upright link defining means pivotally connected adjacent its upper end to said first link adjacent the forward extremity thereof and forward of the point of pivotal connection of said third link defining means to said first link, said fourth link defining means being pivotally secured to said second link at a point intermediate its opposite ends and forward of said pivotal connection between said third link defining means and said second link; and, (e) actuating means coupled to said drive crank for pivoting said fourth link defining means about its point of pivotal connection to said first link between a first forward position where the leading structural edge member is in the non-deflected position coincident with the wing chord reference plane and a second rearward position where the leading structural edge member is in a deflected position with respect to the wing chord reference plane, and wherein said first link, said second link and said fourth generally upright link defining means are all confined entirely within the airfoil envelope at all operative positions of the variable camber airfoil leading edge.

14. An actuating mechanism as set forth in claim 13 wherein said actuating means comprises a power driven rotary actuator.

15. An actuating mechanism as set forth in claim 13 wherein fifth generally upright link defining means are pivotally interconnected at one end to said fourth link defining means and at the other end to the continuous upper flexible skin at about the midpoint thereof between the main frame and the leading structural edge member for imparting stability and rigidity to the upper skin and for maintaining the upper skin in a smooth continuous aerodynamically streamlined airfoil configuration at all operative positions of the variable camber airfoil leading edge.

16. An actuating mechanism as set forth in claim 13 wherein said third generally upright link defining means comprises left and right links straddling said second link.

17. An actuating mechanism as set forth in claims 13 or 16 wherein said fourth generally upright link defining means comprises left and right links straddling said second link.

18. An actuating mechanism as set forth in claims 13, 16 or 17 wherein the effective length of said fourth link defining means between its pivotal connections to said first link and said second link is greater than the effective length of said third link defining means between its pivotal connections to said first link and said second link.

* * * * *